(12) United States Patent
Yamashita

(10) Patent No.: US 7,775,151 B2
(45) Date of Patent: Aug. 17, 2010

(54) HYDRAULIC LIFT STRUCTURE

(75) Inventor: Masaaki Yamashita, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 565 days.

(21) Appl. No.: 11/574,227

(22) PCT Filed: Sep. 14, 2004

(86) PCT No.: PCT/JP2004/013342

§ 371 (c)(1),
(2), (4) Date: Oct. 30, 2007

(87) PCT Pub. No.: WO2006/022031

PCT Pub. Date: Mar. 2, 2006

(65) Prior Publication Data

US 2008/0250917 A1    Oct. 16, 2008

(30) Foreign Application Priority Data

Aug. 24, 2004   (JP) ............................. 2004-244294

(51) Int. Cl.
*F16H 57/04* (2010.01)
*A01B 63/02* (2006.01)
(52) U.S. Cl. ........................ 92/142; 180/900
(58) Field of Classification Search ............. 92/142, 92/171; 180/900
See application file for complete search history.

(56) References Cited

U.S. PATENT DOCUMENTS 3,103,147 A * 9/1963 Peras ...................... 91/48
3,156,156 A    11/1964 Peras
4,787,293 A    11/1988 Kishizawa et al.

FOREIGN PATENT DOCUMENTS

| DE | 1934087 | 1/1971 |
| JP | 53-48808 | 5/1978 |
| JP | 60-86670 | 6/1985 |
| JP | 2028022 | 1/1990 |
| JP | 02028022 A * | 1/1990 |

OTHER PUBLICATIONS

International Search Report for International Application Serial No. PCT/JP2004/13342, mailed on Jan. 11, 2005.
Supplementary European Search Report for corresponding European Patent Application No. 04 77 3024, European Patent Office, mailed on Jun. 4, 2008, 2 pages.

* cited by examiner

*Primary Examiner*—Thomas E Lazo
(74) *Attorney, Agent, or Firm*—Sterne, Kessler, Goldstein & Fox P.L.L.C.

(57) ABSTRACT

In a hydraulic lift structure formed by arranging a hydraulic cylinder case internally provided with a hydraulic cylinder for moving up and down a working machine (a rotary power tiller) in an upper portion of a transmission case of a working vehicle, an oil reservoir of a working fluid for the hydraulic cylinder is provided in a boundary portion between the transmission case and the hydraulic cylinder case in such a manner as to be isolated from an inner portion of the transmission case. The hydraulic lift structure which prevents a malfunction of a hydraulic cylinder or the like and improves a supplying and discharging efficiency of a working fluid.

3 Claims, 10 Drawing Sheets

(a)

(b)

HYDRAULIC LIFT STRUCTURE

BACKGROUND OF THE INVENTION

1. Field of the Invention

The present invention relates to a hydraulic lift structure, and more particularly to a layout structure of an oil reservoir of a working fluid which is supplied to and discharged from a hydraulic cylinder case (a hydraulic cylinder) moving up and down a working machine, in a working vehicle structured such that the working machine is replaceable and detachable such as a back hoe, a rotary power tiller or the like.

2. Background Art

The working vehicle such as a tractor or the like is structured such that the working machine such as the rotary power tiller or the like is arranged in a rear side of a machine body, and a fertilizer applicator, a seeding machine or the like can be replaced and attached in addition to the rotary power tiller or the like, in accordance with a working content. For example, as the tractor in which the unit such as the rotary power tiller or the like is arranged in a rear side of the machine body, and the working vehicle in which the working machine is arranged in a front side and a rear side of the machine body, there is known a back hoe loader in which a front loader is arranged in the front side of the machine body and a back hoe is arranged in the rear side of the machine body, or the like.

In the working machine mentioned above, the rotary power tiller or the like is structured such that the working machine is lifted upward in such a manner that the working machine is not in contact with a ground level at a time of a normal traveling of the working vehicle, and is descended at a time of executing a work so as to be grounded on a farm field. Further, the structure is made such that its upper and lower positions are adjusted in correspondence to a state of the farm field surface and in such a manner as to achieve a target depth of plowing during the operation. In order to make it possible to move the working machine up and down, a hydraulic cylinder coupled to a lift arm and moving up and down the working machine by a hydraulic pressure is normally arranged in a rear portion of a transmission case, whereby a hydraulic lift structure is formed.

In the hydraulic lift structure of the working vehicle mentioned above, there has been generally proposed a structure in which a hydraulic cylinder or the like is provided inside a hydraulic cylinder case, the hydraulic cylinder case is arranged at a lower position of a driver seat in an upper side of a rear portion of a transmission case, and the hydraulic cylinder case is detachable with respect to the transmission case (refer to Patent Documents 1 and 2).

Further, as disclosed in Patent Document 3, a working fluid in an oil reservoir formed within the transmission case is pressure fed and supplied to a hydraulic cylinder, a hydraulic valve or the like arranged in the hydraulic cylinder case by a hydraulic pump or the like, and a return fluid from the hydraulic cylinder, the hydraulic valve or the like is again returned into the transmission case via the hydraulic cylinder case (refer to Patent Document 3).

Patent Document 1: Japanese Unexamined Patent Publication No. 8-104149

Patent Document 2: Japanese Unexamined Patent Publication No. 7-39201

Patent Document 3: Japanese Unexamined Utility Model Publication No. 5-31507

Of course, as disclosed in Patent Document 1 and Patent Document 2, it is possible to improve a maintenance characteristic of the working vehicle and make an assembling work or the like easy by setting the hydraulic cylinder case (the hydraulic cylinder) structured such as to be detachable with respect to the transmission case.

However, in the conventional hydraulic lift structure, as disclosed in Patent Document 3, the working fluid supplied to and discharged from the hydraulic cylinder is used in common with the working fluid supplied to and discharged from the transmission. Accordingly, a dust garbage (a contamination) generated from a mechanical gear mechanism such as a sub transmission, a PTO transmission, a differential gear or the like constituting the transmission mixes into the hydraulic cylinder case, and there is a case that the hydraulic cylinder gets out of order due to the dust garbage.

Further, in the conventional hydraulic lift structure, in order to prevent the contamination mentioned above, a line filter is arranged in an oil path for supplying and discharging the working fluid in addition to a suction filter. Accordingly, an oil path pressure is lowered by arranging the line filter, and a temperature of the working fluid is ascended so as to generate a reduction of a power transmission efficiency, a reduction of a fuel consumption or the like. Further, a manufacturing cost of the working vehicle (the hydraulic lift structure) becomes higher by arranging the line filter.

A problem to be solved is to propose a hydraulic lift structure which prevents a malfunction of a hydraulic cylinder or the like and improves a supplying and discharging efficiency of a working fluid.

The problem to be solved by the present invention is as mentioned above, and a description will be given next of a means for solving the problem.

SUMMARY OF THE INVENTION

In a hydraulic lift structure in accordance with the present invention, there is provided a hydraulic lift structure formed by arranging a hydraulic cylinder case internally provided with a hydraulic cylinder for moving up and down a working machine in an upper portion of a transmission case of a working vehicle, wherein an oil reservoir of a working fluid for the hydraulic cylinder is provided in a boundary portion between the transmission case and the hydraulic cylinder case in such a manner as to be isolated from an inner portion of the transmission case.

Further in the hydraulic lift structure in accordance with the present invention, the oil reservoir is attached in such a manner that a concave portion is formed in an upper portion of the transmission case, and the hydraulic cylinder case covers an upper side of the concave portion.

Further, in the hydraulic lift structure in accordance with the present invention, the oil reservoir is used as the oil reservoir of the working fluid for the working machine.

In the hydraulic lift structure in accordance with the present invention, since the oil reservoir of the working fluid for the hydraulic cylinder is provided in the boundary portion between the transmission case and the hydraulic cylinder case in such a manner as to be isolated from the inner portion of the transmission case, it is possible to prevent the dust garbage or the like generated by the mechanical gear mechanism or the like within the transmission case from mixing into the hydraulic cylinder case, and it is possible to prevent the malfunction of the hydraulic cylinder or the like caused by the dust garbage or the like mentioned above. Further, it is not necessary to arrange the filters (the line filter and the like) for removing the dust garbage or the like, and it is possible to improve the supplying and discharging efficiency of the working fluid. Further, it is not necessary to drain the oil from the hydraulic cylinder case at a time of detaching the hydraulic cylinder case from the transmission case, and it is possible to improve a maintenance characteristic.

Further, in the hydraulic lift structure in accordance with the present invention, since the oil reservoir is attached in such a manner that the concave portion is formed in the upper portion of the transmission case, and the hydraulic cylinder case covers the upper side of the concave portion, it is not necessary to set the additional member in the transmission case or the like, it is possible to reduce a manufacturing cost, and it is possible to omit an installation space of the member. Further, it is possible to effectively utilize a dead space in an upper portion of the transmission case, and it is possible to reinforce the upper portion of the transmission case.

Further, in the hydraulic lift structure in accordance with the present invention, since the oil reservoir is used as the oil reservoir of the working fluid for the working machine, the dust garbage or the like does not mix into a hydraulic system device of the working machine, it is possible to prevent the malfunction of the device caused by the dust garbage or the like, and it is possible to prevent the oil path pressure from being lowered by the filters so as to improve the supplying and discharging efficiency of the working fluid. Further, since the working fluid does not mix with the lubricating oil within the transmission case, it is possible to suppress the ascent of the oil temperature of the working fluid, and it is possible to suppress a deterioration of the working fluid.

DETAILED DESCRIPTION OF THE INVENTION

Figure 1:
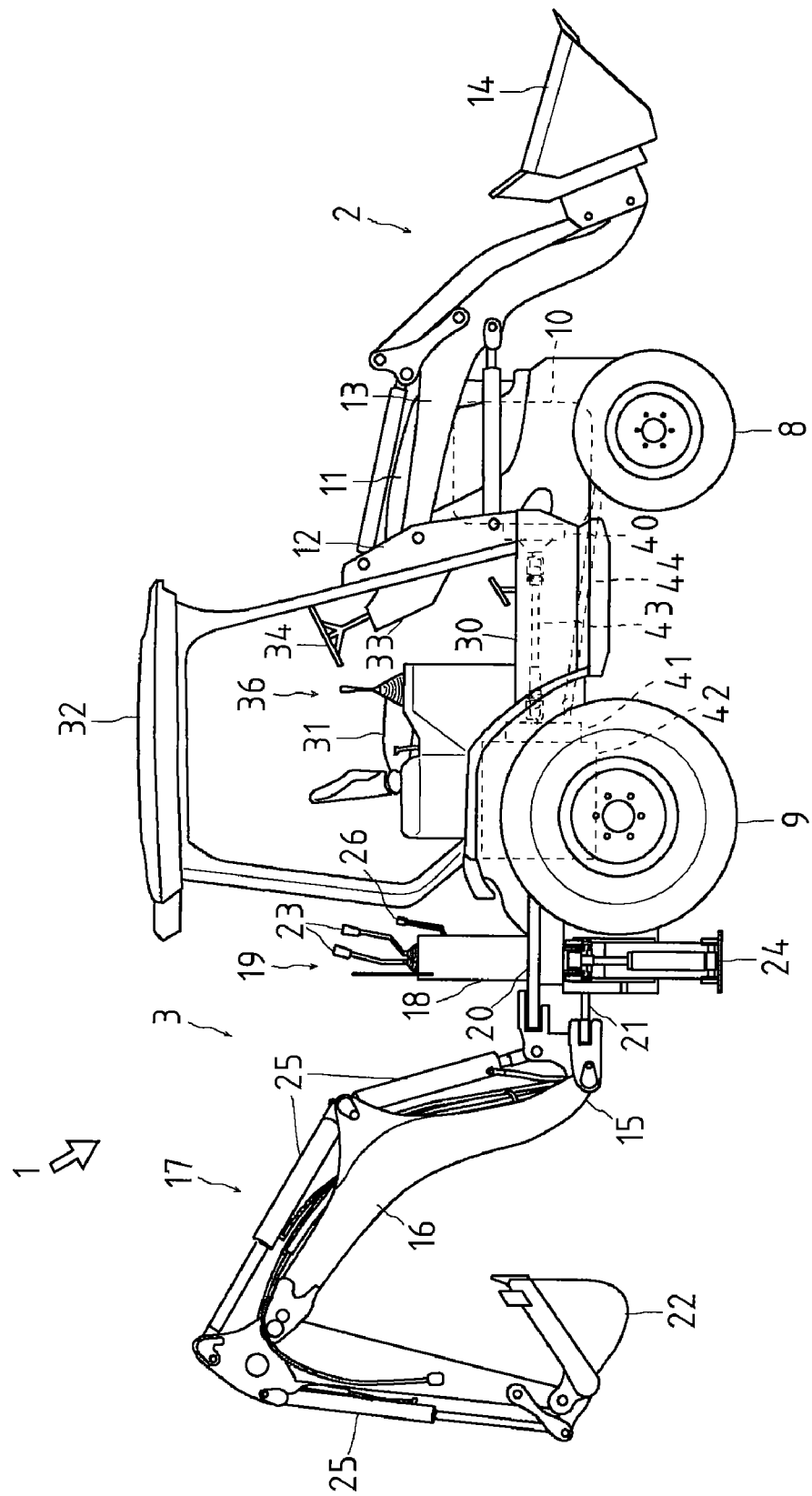
FIG. 1 is a side elevational view showing an entire structure of a working vehicle provided with a hydraulic lift structure in accordance with the present invention.

Next, a description will be given of an embodiment in accordance with the present invention.

A working vehicle 1 in the present embodiment is structured such that a front loader 2 is arranged in a front side of a machine body, and a back hoe 3 structured such as to be replaceable is arranged in a rear side of the machine body. Further, the working vehicle 1 is structured such that a rotary power tiller 4 serving as a working machine moved up and down by a hydraulic cylinder 50 mentioned below is arranged in place of the back hoe 3.

First, a description will be given below of a whole structure of the working vehicle 1 in accordance with the present embodiment.

Figure 2:
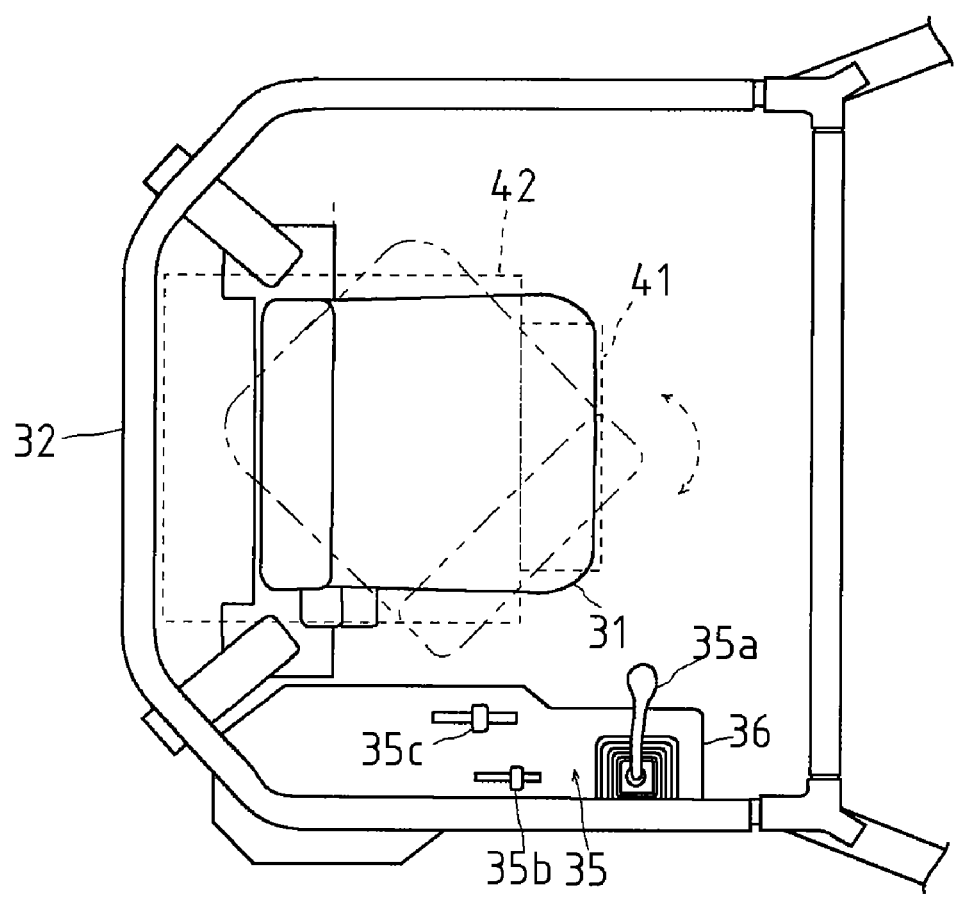
FIG. 2 is a plan view of a control portion.

As shown in FIGS. 1 and 2, the working vehicle 1 in accordance with the present embodiment is structured as a back hoe loader, and the front loader 2 serving as a loading apparatus and the back hoe 3 are installed (hereinafter, a direction in which the front loader 2 is arranged is set to a front side of the working vehicle 1). A pair of approximately linear right and left machine body frames 5 (refer to FIGS. 5 and 6) formed from a front end portion of the machine body to a rear end portion are arranged so as to be approximately symmetrical in a plan view, and front wheels 8 and 8 and rear wheels 9 and 9 are attached to the front portion and the rear portion of the machine body frame 5 via a front axle case and a rear axle case (not shown). An engine 10 is mounted to an upper portion of a front side of the machine body frame 5, and the engine 10 is covered by a hood 11.

The front loader 2 is constituted by a bracket 12, a lift arm 13 and the like. The bracket 12 is arranged in both right and left sides of the hood 11, and is fixed to the machine body frame 5. The lift arm 13 is attached to the bracket 12, and is structured such that a longitudinally center portion is bent upward from a line obtained by connecting both ends so as to be formed as an approximately obtuse shape, thereby allowing steering and turning the front wheels 8 and 8 arranged in the lower side. Further, a bucket 14 structured such as to be rotatable up and down is arranged in a front end of the lift arm 13.

The back hoe 3 is structured such as to be detachable with respect to the machine body frame 5, and is continuously provided with an excavation apparatus portion 17 constituted by a boom bracket 15, a boom 16 and the like, and an operation apparatus portion 19 constituted by a control box 18 in which each of operation levers 23 or the like is arranged, and the like, via a machine frame 20. In this case, the machine frame 20 is formed such that a mounting portion 20a protrudes toward a front side of the machine body (refer to FIG. 4(a)), and is detachably mounted to the machine body (the machine body frame 5 or the like) via the mounting portion 20a. Further, both right and left sides of the machine frame 20 are provided with an outrigger 24 grounded on a surface of earth in the case of executing an excavating work by the back hoe 3 so as to fix the position of the working vehicle 1. The outrigger 24 is oscillated to an upper side around a coupling portion to the machine frame 20 so as to be supported and fixed, in the case that the excavating work by the back hoe 3 is not executed.

As a structure of the excavation apparatus portion 17, the boom bracket 15 is provided in an end portion of the machine frame 20 in such a manner as to protrude toward a rear side of the machine body frame 5, and the boom bracket 15 is pivoted in such a manner as to be rotatable rightward and leftward with respect to the machine frame 20. A base portion of the boom 16 formed in an approximately C-shaped side elevational view is pivoted to the boom bracket 15 in such a manner as to be rotatable forward and backward, and a pair of right and left hydraulic cylinders 21 and 21 are provided side by side between the boom 16 and the machine frame 20. The structure is made such that the boom 16 can be oscillated rightward and leftward with respect to the machine frame 20 by alternately expanding and contracting the hydraulic cylinders 21 and 21. A bucket 22 serving as a working attachment is pivoted to a leading end portion of the boom 16 in such a manner as to be rotatable forward and backward.

As a structure of the operation apparatus portion 19, the control box 18 is arranged in a forward position of the boom bracket 15 on the machine frame 20, and operation levers 23 and 23 for operating the back hoe 3 up, down, right and left are protruded from an upper portion of the control box 18. The structure is made such that the oscillation control of the boom 16 or the like can be executed by operating the operation levers 23 and 23, thereby supplying the pressurized oil to each of hydraulic cylinders 25, 25, . . . arranged in the boom 16. Operation levers 26 and 26 for operating the outrigger 24 are protruded from the front side of the control box 18, and the structure is made such that the outrigger 24 can be vertically oscillated by operating the operation levers 26 and 26, thereby controlling a hydraulic cylinder of the outrigger 24.

A step 30 is provided in a longitudinally center portion of the machine frame 5 so as to be approximately horizontal with respect to the machine frame 5. A driver seat 31 is arranged in an upper side of a rear portion of the step 30, and a canopy 32 supported by four frames is arranged in an upper side of the driver seat 31. The driver seat 31 is structured such that its posture can be freely changed in a longitudinal direction, and an operator can operate the front loader 2 and the back hoe 3 installed to front and rear sides of the machine body while seating on the driver seat 31, by rotating the driver seat 31 front and rear (refer to FIG. 2). In this case, an upper portion of a transmission case 42 mentioned below is arranged in a lower side of the driver seat 31.

A dash board 33 is provided in a rising manner in a front side of the step 30, and a steering wheel 34 for steering is provided so as to protrude from the dash board 33. In a side portion of the driver seat 31, there are concentrically arranged a hydraulic operation device 35 constituted by a working lever 35a for the loader work, an accelerator lever 35b, a sub shift lever 35c and the like, and an operation apparatus portion 36 constituted by a display apparatus such as a meter or the like, and the like.

In the working vehicle 1 structured as mentioned above, at a time of driving the working vehicle 1, the driver seat 31 is steered to a forward side, and the machine body is steered by operating the steering wheel 34. In the case of operating the front loader 2, the operator operates the working lever 35a or the like of the operation apparatus portion 36 while leaving the driver seat 31 as it is (in a forward moving state) so as to control the front loader 2. In the case of operating the back hoe 3, the operator rotates the driver seat 31 to a rear side at 180 degree, and operates the operation lever 23 or the like protruding from the control box 18 in the operation apparatus portion 19 structured in the rear side of the machine body so as to operate the back hoe 3 and the outrigger 24.

Next, a description will be briefly given below of a power transmission system of the working vehicle 1.

Figure 3:
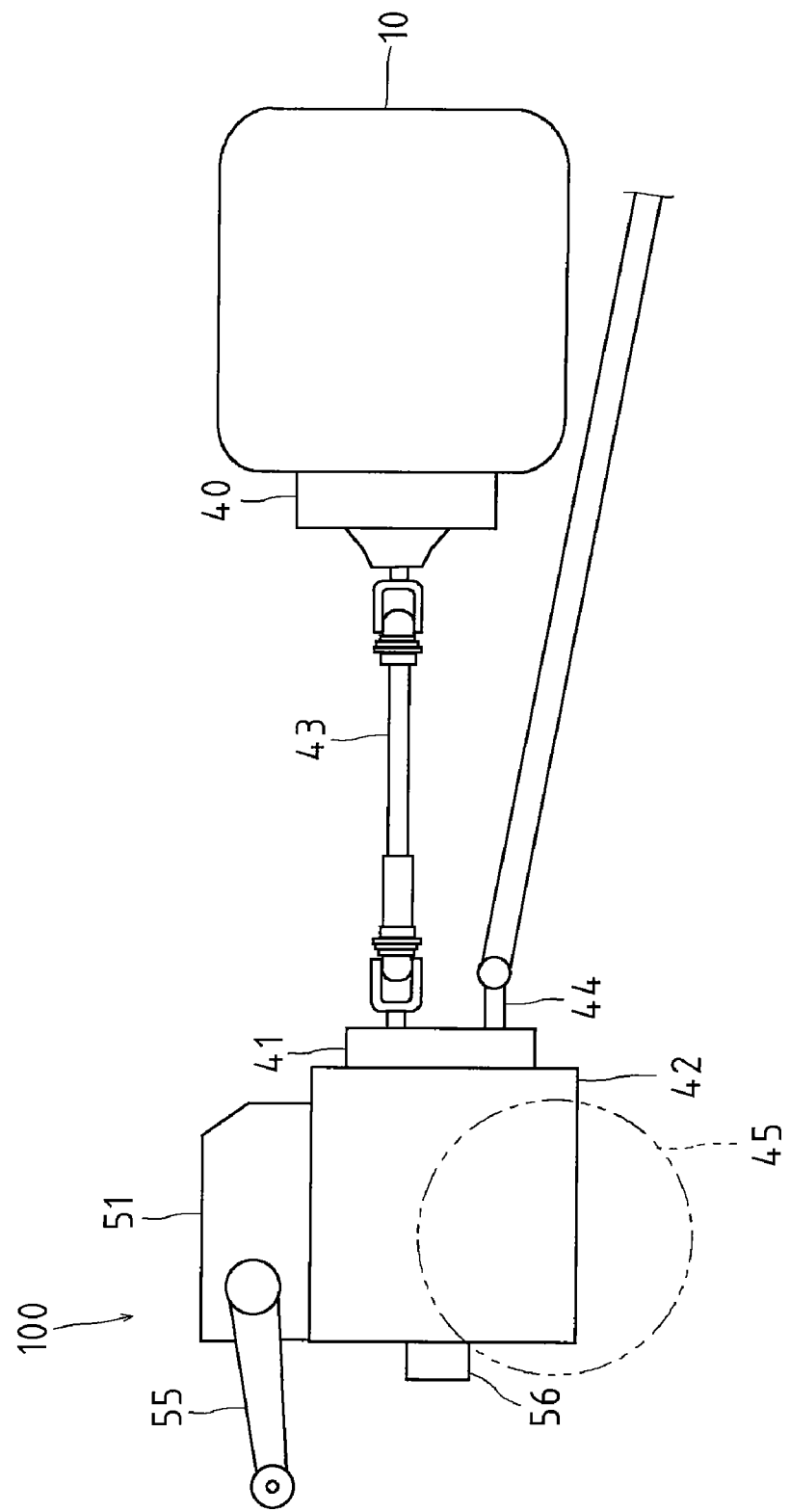
FIG. 3 is a schematic side elevational view showing a power transmission system of the working vehicle.

As shown in FIG. 3, in the working vehicle 1, the engine 10 is horizontally supported between the right and left machine body frames, and a rear side of the engine 10 is continuously provided with a clutch housing 40, an HST case 41 and a transmission case 42, in that sequence, which serve as serving as a travel driving system. The HST case 41 is inward provided with a hydraulic stepless type transmission apparatus (not shown) constituted by a hydraulic pump and a hydraulic motor, thereby constructing a main transmission apparatus; however, it is possible to arrange it within the transmission case, and the main transmission apparatus can be constituted by a stepped type engaging gear or a hydraulic clutch type or the like. The transmission case 42 is internally provided with a sub transmission apparatus, a PTO transmission apparatus, a differential gear and the like (not shown), and is structured such that a front wheel transmission shaft 44 transmitting a travel driving force to a front axle case is protruded from a front surface, and a PTO shaft 56 for driving the working machine is protruded from a rear surface.

An output shaft (not shown) of the engine 10 is protruded to the rear side of the machine body, and the output shaft is connected to a universal joint 43 provided in a longitudinal direction of the machine body via a main clutch or a damper within the clutch housing 40. The universal joint 43 is connected to a transmission shaft (not shown) in the rear side of the machine body, and the transmission shaft is coupled in an interlocking manner to a hydraulic stepless transmission apparatus within the HST case 41 and a gear transmission apparatus (not shown) within the transmission case 42.

As mentioned above, the drive of the engine 10 is transmitted to the transmission shaft from the output shaft of the engine 10 via the universal joint 43, and is transmitted to an axle (not shown) within a rear axle case 45 provided so as to protrude from the transmission case 42, whereby the rear wheel 9 is driven. Further, the structure is made such that the rotation via the hydraulic stepless transmission apparatus within the HST case 41 is transmitted to a differential gear (not shown) within a front axle case via the front wheel transmission shaft 44, thereby driving the front wheel 8.

Next, a description will be given below of a mounting structure of the working machine to the machine body.

The working vehicle 1 in the present embodiment is structured such that the back hoe 3 is arranged as the working machine as mentioned above; however, the present embodiment is structured such that the back hoe 3 can be replaced by the other working machines so as to be mounted. A description will be given below of a case that the back hoe 3 is arranged, and a case that the rotary power tiller 4 is arranged in place of the back hoe 3, in a contradistinctive manner. In this case, as the working machine which can be replaced by the back hoe 3, it is possible to mount a fork lift, a multiple working machine, a fertilizer applicator, a seeding machine or the like, in addition to the rotary power tiller 4.

Figure 4:
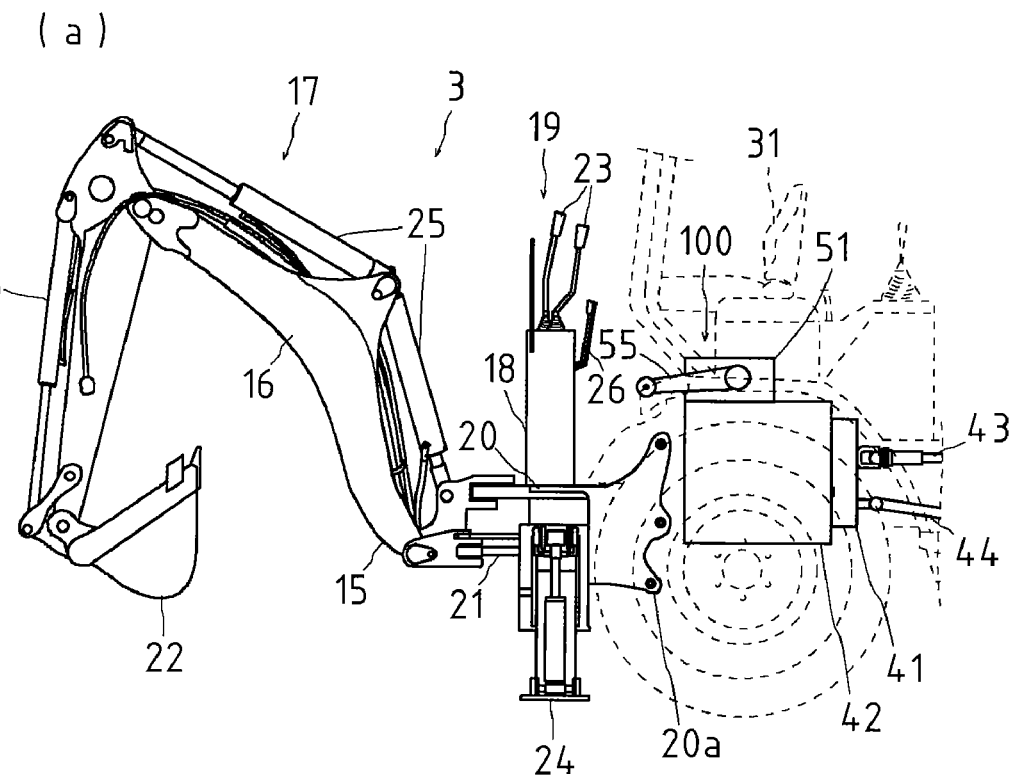
FIGS. 4(a) and 4(b) are partly omitted side elevational views of mounting portions of a back hoe and a rotary power tiller.
Figure 4:
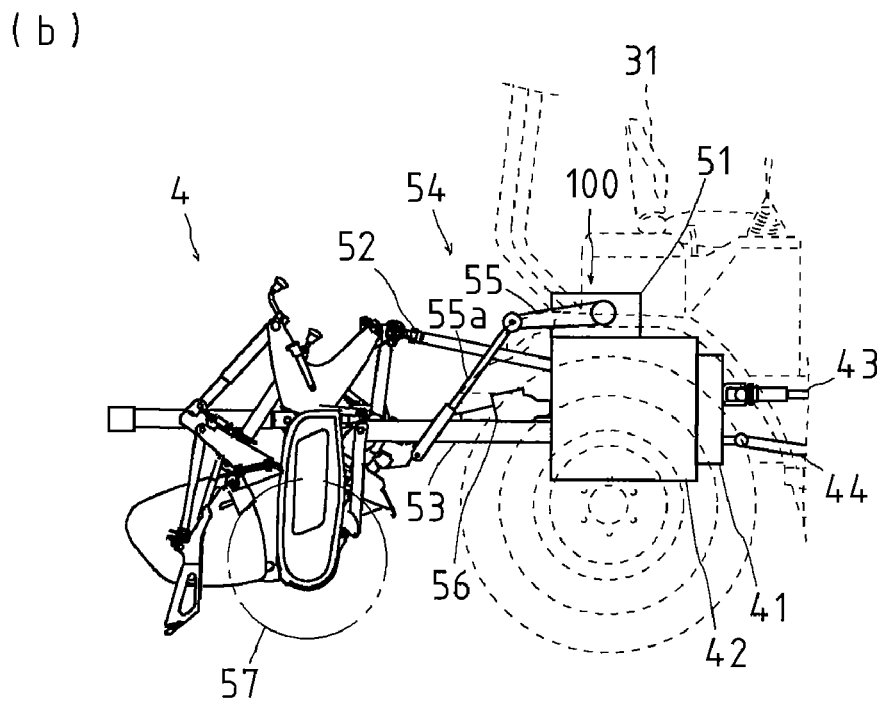
Figure 5:
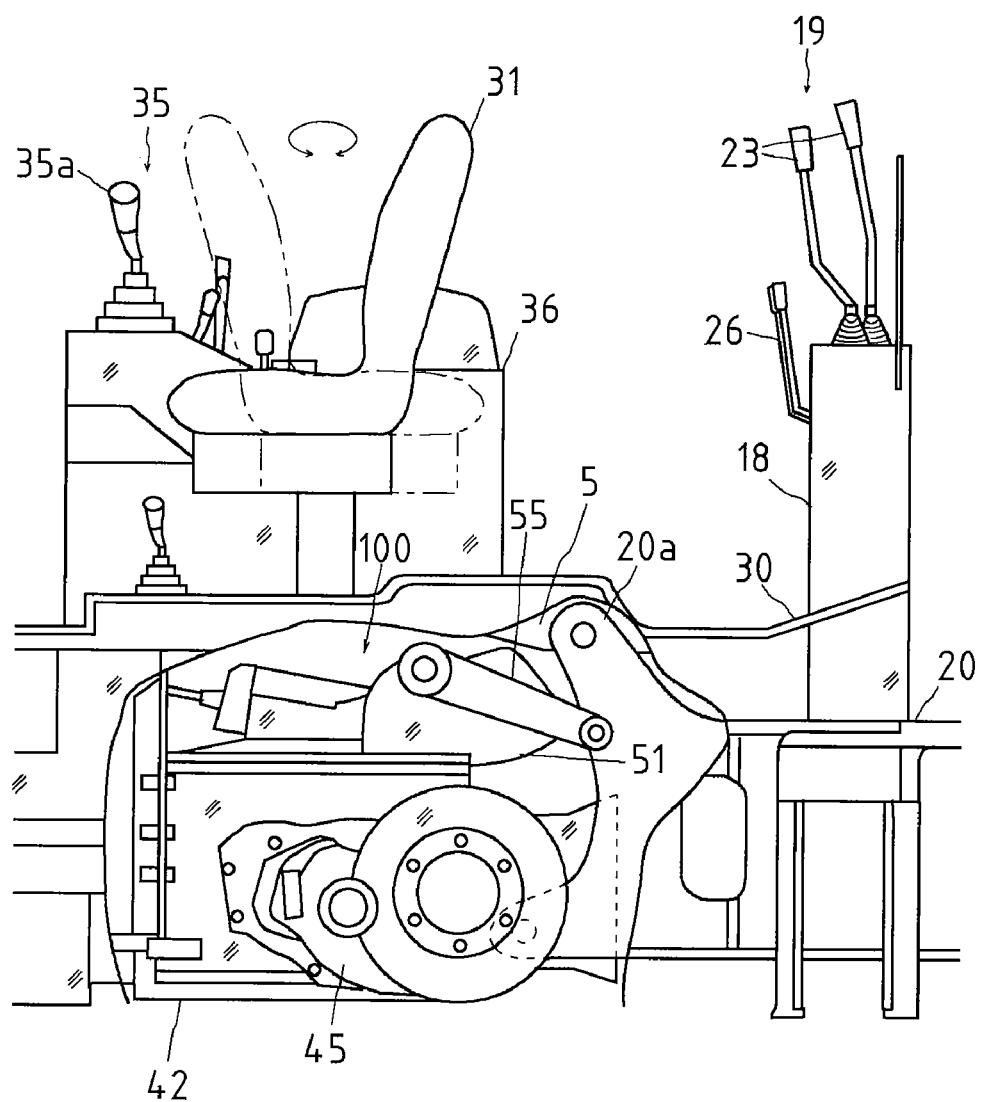
FIG. 5 is a side elevational view in the periphery of the hydraulic lift structure.

As shown in FIGS. 4(a) and 5, in the case that the back hoe 3 is arranged in the rear side of the machine body, the back hoe 3 is installed in such a manner that the mounting portion 20a formed by protruding a part of the machine frame 20 toward the front side of the machine body is fixed to the rear portion of the machine body of the machine body frame 5. The back hoe 3 is structured such that the operator operates the operation lever 23 or the like arranged in the control box 18 so as to operate the back hoe 3 and the outrigger 24, in a state in which the operator sits on the driver seat 31, by rotating the driver seat 31 backward at 180 degrees. In the back hoe 3, it is not necessary to execute such an elevating operation as to fluctuate its upper and lower positions with respect to the machine body (the machine body frame 5), and the upper and lower positions of the back hoe 3 are fixed.

Figure 6:
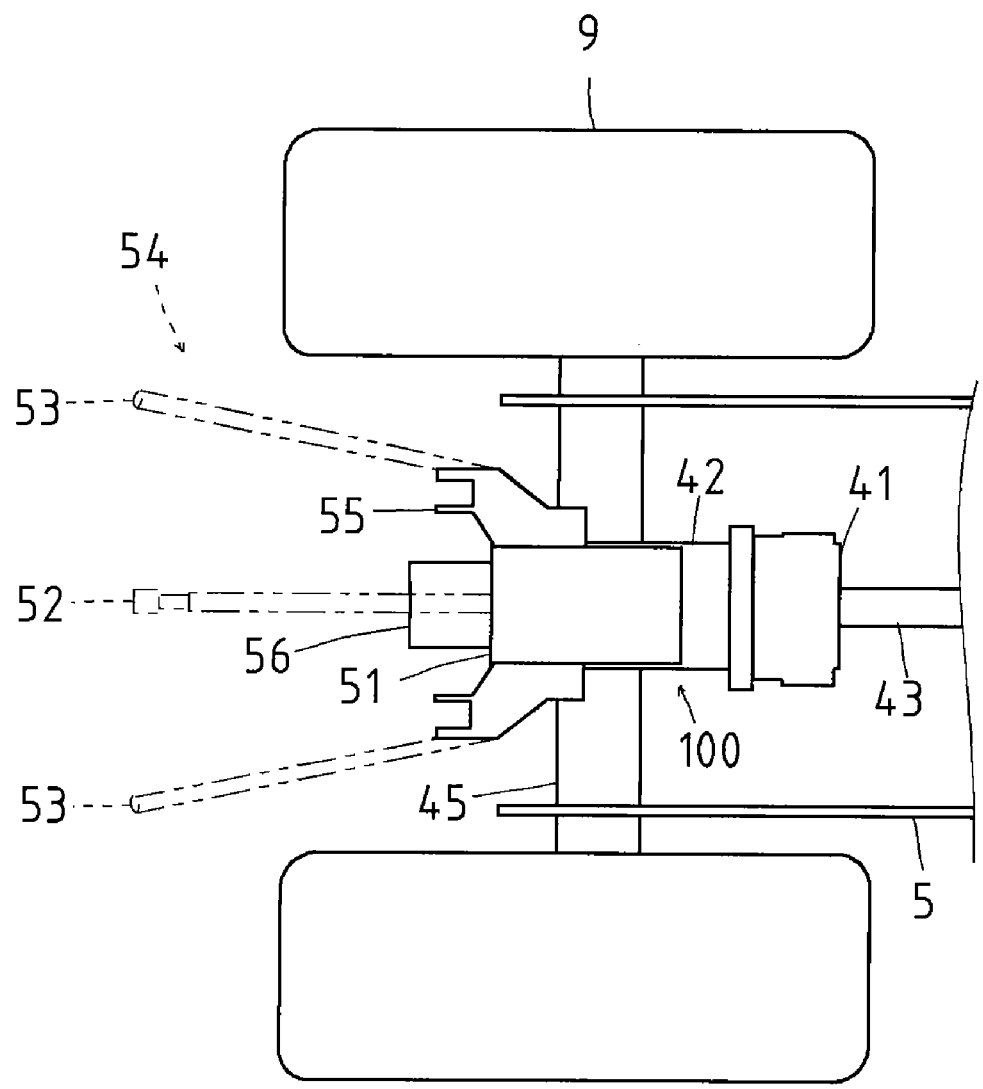
FIG. 6 is a rear plan view of a mounting portion of the working vehicle.

On the other hand, as shown in FIGS. 4(b) and 6, in the case that the rotary power tiller 4 is arranged in the rear side of the machine body, the rotary power tiller 4 is mounted to the machine body by a known mechanism. In other words, the rotary power tiller 4 is arranged in the rear side of the machine body via a three-point link mechanism 54 constituted by a top link 52, and a pair of right and left lower links 53 and 53, and is coupled thereto so as to be freely elevated and be rotatable. Specifically, a lift arm 55 coupled to a hydraulic cylinder 50 mentioned below so as to be freely driven in an oscillating manner, and the lower links 53 and 53 are coupled via rods 55a and 55a, and are structured so as to be slidable up and down by the hydraulic cylinder 50. Further, a PTO shaft 56 for driving the working machine is protruded from the rear side surface of the transmission case, and the PTO shaft 56 is coupled to the rotary power tiller 4, and is structured so as to rotatably drive the rotary power tiller 57. In this case, since the three-point link mechanism 54 is detachably structured so as to be detachable with respect to the machine body, and there is a case that the three-point link mechanism 54 is not necessary in the other working machine, the structure thereof can be appropriately changed. Further, it is possible to employ a two-point link by omitting the top link 52.

Next, a description will be given in detail below of a hydraulic lift structure 100 in accordance with the present embodiment.

Figure 7:
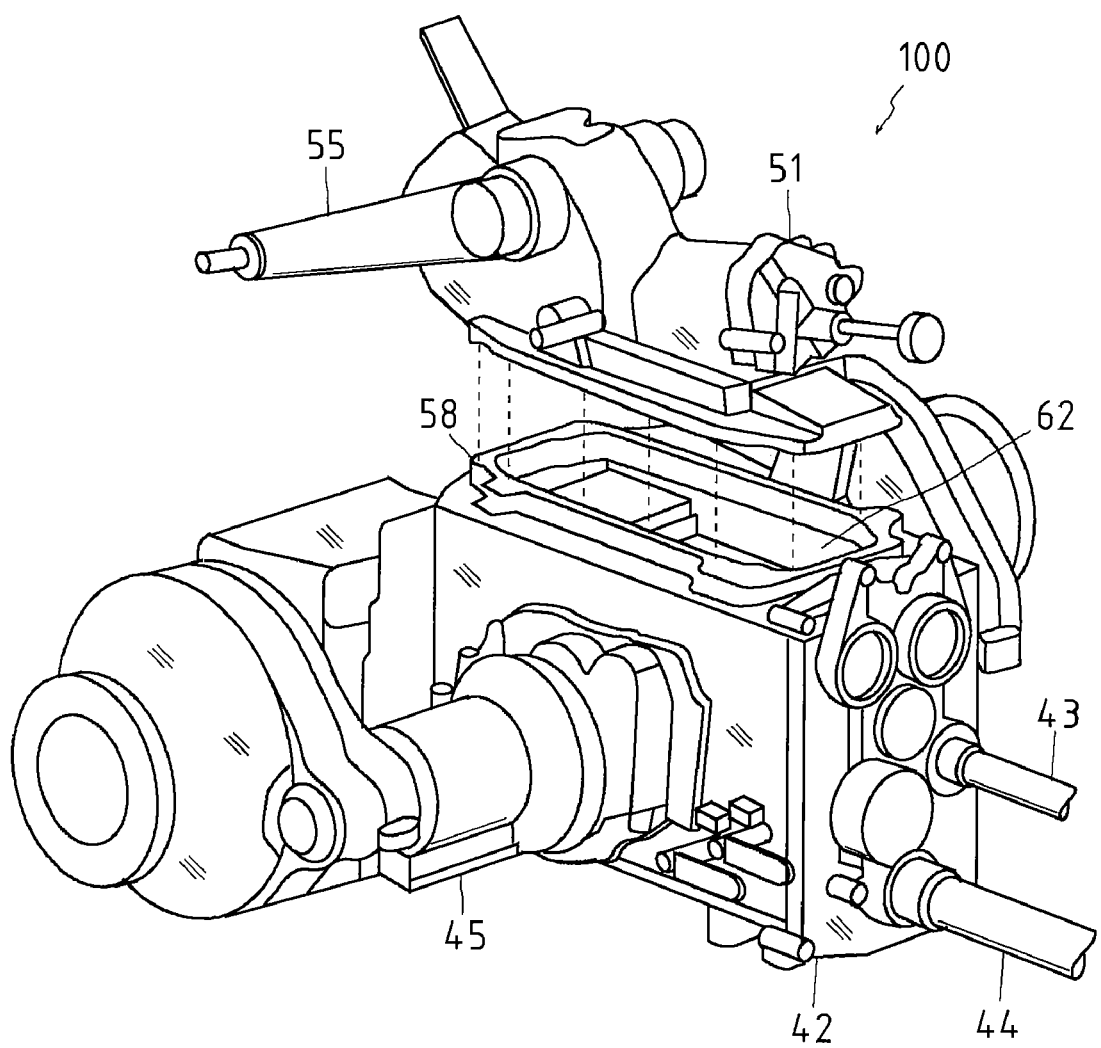
FIG. 7 is a front perspective schematic view of the hydraulic lift structure.
Figure 8:
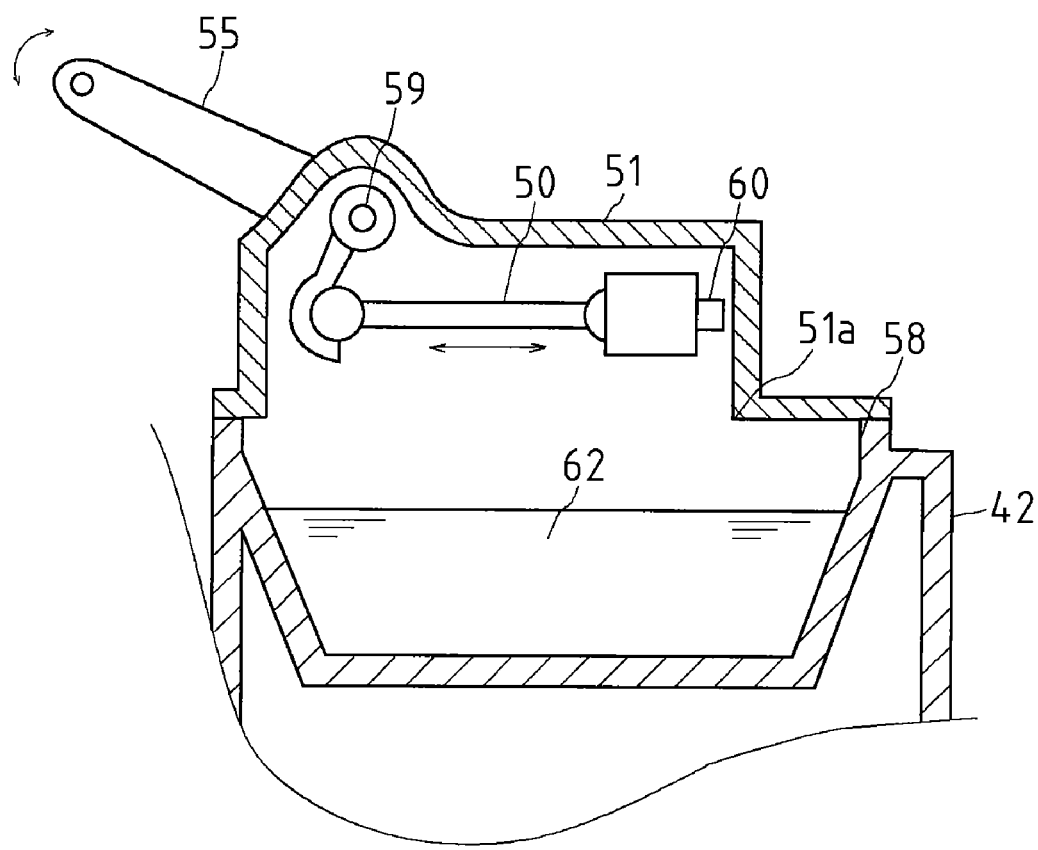
FIG. 8 is a side cross sectional view of FIG. 7.

As shown in FIGS. 7 and 8, the hydraulic lift structure 100 in accordance with the present embodiment is structured such as to be integrally provided with the hydraulic cylinder 50 for vertically oscillating the lift arm 55 and elevating the working machine mounted to the rear side of the machine body and the hydraulic cylinder case 51 which is internally provided with the hydraulic cylinder 50, in the upper portion of the transmission case 42. The hydraulic cylinder 50 is structured so as to be expanded and contracted back and forth with respect to an aim shaft 59 pivoted to the hydraulic cylinder case 51 in a horizontal direction of the hydraulic cylinder case 51 in a state of being interlocked by a piston rod 60. The arm shaft 59 protrudes from both side walls of a rear portion of the hydraulic cylinder case 51, and a base portion of the lift arm 55 is fixedly provided in both right and left ends of the arm shaft 59 in the protruding portion mentioned above. The hydraulic cylinder 50 is expanded and contracted, whereby the lift arm 55 is operated so as to be vertically oscillated via the arm shaft 59.

An oil reservoir 62 in which a working fluid supplied to and discharged from the hydraulic cylinder 50 is formed in a boundary portion between the hydraulic cylinder case 51 and the transmission case 42 in such a manner as to be isolated from an inner portion of the transmission case 42. Specifically, a concave portion 58 provided in a concave manner as an approximately rectangular shape in a plan view is formed in an upper portion of the transmission case 42, and the oil reservoir 62 storing the working fluid of the hydraulic cylinder 50 is formed in the concave portion 58. In other words, the oil reservoir 62 is arranged in such a manner as to face to an upper space of the transmission case 42. The hydraulic cylinder case 51 is arranged in close contact with an outer edge portion of the concave portion 58 so as to cover the upper side of the concave portion 58, in such a manner as to prevent the working fluid from leaking out from the contact surface. The hydraulic cylinder case 51 is screwed via a rubber packing or the like by a bolt or the like in the contact portion with the transmission case 42; however, the installing means is not limited to this.

Since the hydraulic cylinder case 51 is arranged so as to be brought into contact with the upper surface of the transmission case 42, the inner portion of the hydraulic cylinder case 51 is not communicated with the inner portion of the transmission case 42. On the other hand, since an opening portion 51a open in a lower side is formed in the hydraulic cylinder case 51, and the opening portion 51a is open to the oil reservoir 62 formed in the concave portion 58 in the upper portion of the transmission case 42, the inner portion of the hydraulic cylinder case 51 is communicated with the oil reservoir 62 via the opening portion 51a; however, the inner portion of the transmission case 42 is isolated from the oil reservoir 62 by the upper side surface. Further, the working fluid stored in the oil reservoir 62 is supplied to and discharged from the hydraulic cylinder 50, and is supplied for the telescopic operation of the piston rod 60. As mentioned above, the oil reservoir 62 is structured so as to be isolated from the inner portion of the transmission case 42, in such a manner as to prevent the working fluid of oil reservoir 62 from being mixed with the working fluid stored in the oil reservoir (not shown) formed within the transmission case 42 that is supplied to and discharged from each of the mechanisms in the inner portion of the transmission case 42.

As mentioned above, since the hydraulic lift structure 100 is provided with the oil reservoir 62 of the working fluid for the hydraulic cylinder 50 in the boundary portion between the transmission case 42 and the hydraulic cylinder case 51, so as to be isolated from the inner portion of the transmission case 42, it is possible to store the working fluid for the hydraulic cylinder 50 without mixing with the working fluid for each of the mechanisms within the transmission case 42. Accordingly, it is possible to prevent the dust garbage or the like generated by the mechanical gear mechanism or the like constituting the transmission case 42 from being mixed into the hydraulic cylinder case 51 so as to prevent a failure of the hydraulic cylinder 50 or the like caused by the dust garbage or the like. Further, it is not necessary to arrange filters (a line filter and the like) for removing the dust garbage or the like in the oil path of the working fluid supplied to and discharged from the hydraulic cylinder case 51. Accordingly, it is possible to prevent the oil path pressure from being reduced by the filters mentioned above so as to improve a supply and discharge efficiency of the working fluid, and it is possible to reduce a manufacturing cost in comparison with the conventional hydraulic lift structure. Further, it is not necessary to drain the oil from the hydraulic cylinder case 51 at a time of detaching the hydraulic cylinder case 51 from the transmission case 42, it is easy to execute an attaching and detaching work of the hydraulic cylinder case 51, and a maintenance characteristic is improved.

Further, in the hydraulic lift structure 100 in accordance with the present embodiment, since the concave portion 58 is formed in the upper portion of the transmission case 42 as the oil reservoir 62 mentioned above, it is not necessary to independently set a member, for example, a working fluid tank or the like for the hydraulic cylinder 50 in the transmission case 42 or the like, it is possible to reduce a manufacturing cost, and it is possible to omit an installation space of the working fluid tank. Further, since the hydraulic cylinder case 51 is mounted in such a manner as to cover the upper side of the concave portion 58, the working fluid in the oil reservoir 62 does not leak out of the machine, and it is possible to easily prevent the dust garbage outside the machine from being mixed into the oil reservoir 62.

As mentioned above, in the hydraulic lift structure 100 in accordance with the present embodiment, since the working fluid stored in the oil reservoir 62 mentioned above is isolated from the inner portion of the transmission case 42, that is, structured so as to be separated from the working fluid supplied to and discharged from the mechanical gear mechanism or the like provided in the inner portion of the transmission case 42, it is possible to prevent the dust garbage or the like from being mixed into the hydraulic cylinder case 51. Accordingly, the working fluid mentioned above is not only supplied to and discharged from the hydraulic cylinder 50 within the hydraulic cylinder case 51, but may be also used in common with the working fluid for actuating, for example, the working machine (the back hoe 3 or the rotary power tiller 4) or the like arranged in the rear side of the machine body so as to be supplied to and discharged from the hydraulic cylinder or the working machine (for example, the hydraulic cylinders 21 and 25 of the back hoe 3). By using the oil reservoir 62 as the oil reservoir of the working fluid for the working machine, the dust garbage or the like is not mixed to the hydraulic device of the working machine, and it is possible to prevent the failure of the device caused by the dust garbage or the like, and the supply and discharge efficiency is improved while preventing the reduction of the oil path pressure by the filters.

Figure 9:
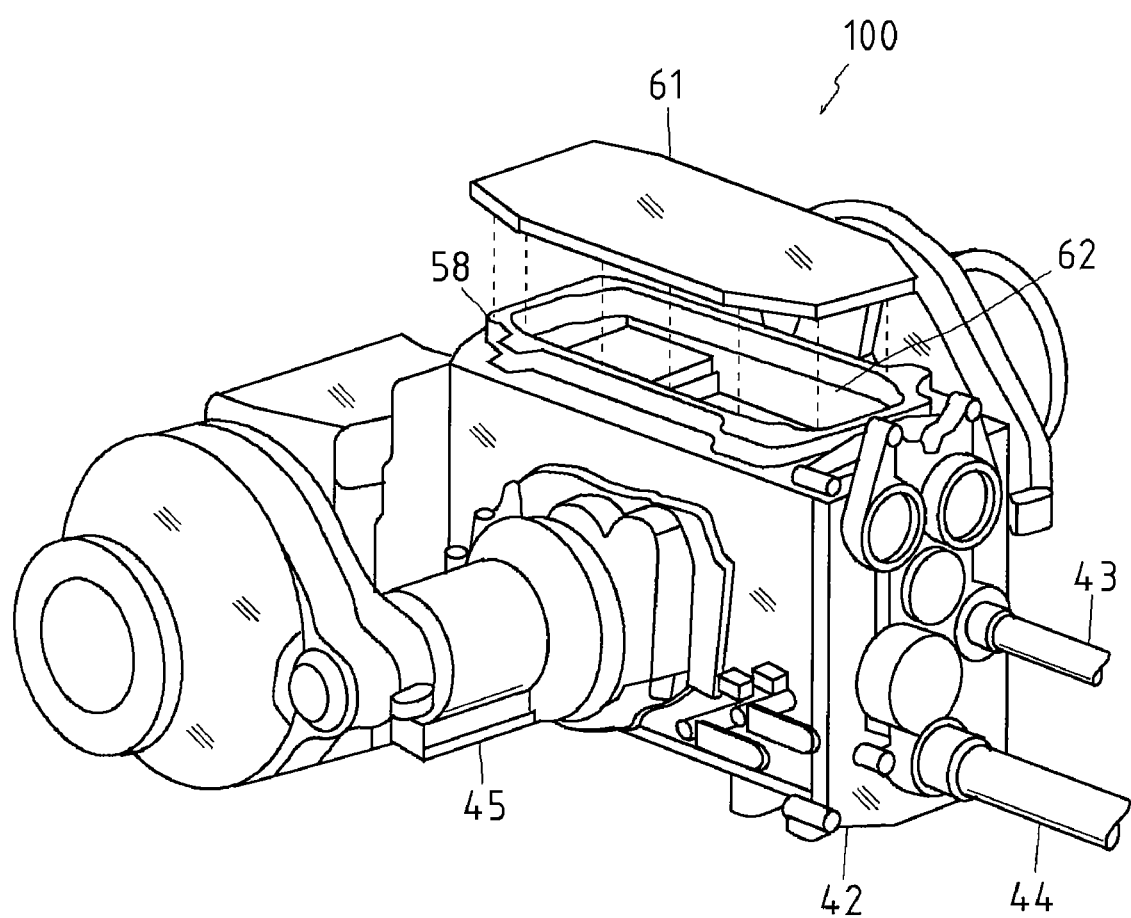
FIG. 9 is a front perspective view of FIG. 7 in which the hydraulic cylinder case is detached.
Figure 10:
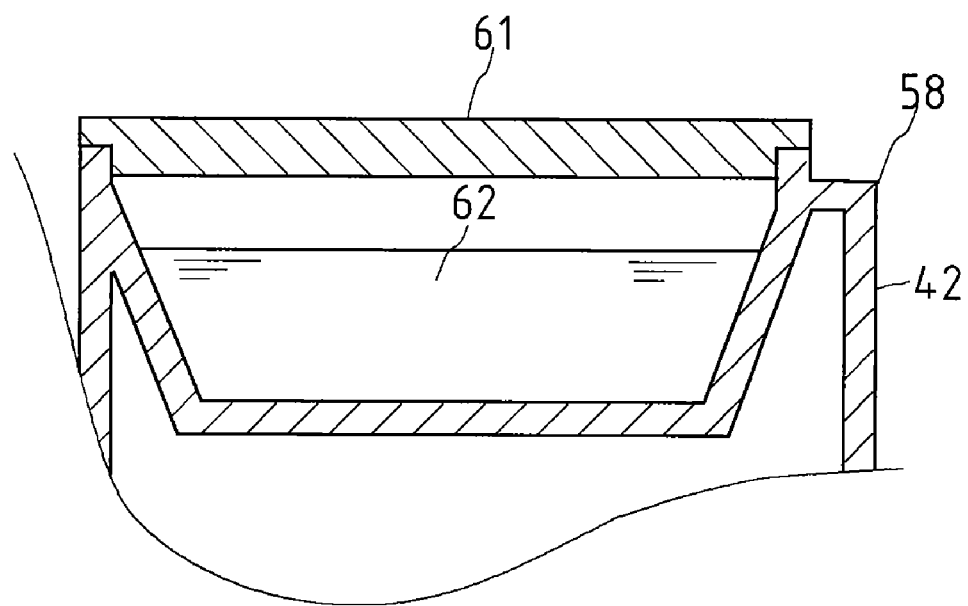
FIG. 10 is a side cross sectional view of FIG. 9.

In this case, as shown in FIGS. 9 and 10, in the case that the working machine which does not require the elevating operation by the hydraulic cylinder 50, the hydraulic lift structure 100 in accordance with the present embodiment is structured such that the working machine can be detached. The structure is made such that the cap member 61 is fitted to the concave portion 58 from the above so as to close the concave portion 58. The cap member 61 is formed as an approximately rectangular shape in a plan view in which an upper surface forms a flat surface, is interposed by a rubber packing or the like in the contact portion with the transmission case 42, and is screwed by a bolt or the like.

For example, in the case that the elevating operation by the hydraulic cylinder 50 is not necessary, such as the back hoe 3, it is not necessary to arrange the hydraulic cylinder 50 or the like in the upper portion of the transmission case 42, and it is possible to enlarge a lower space between the transmission case 42 and the driver seat 31 so as to increase an interior comfort by detaching the hydraulic cylinder 50 or the like from the transmission case 42. Further, in the case that the hydraulic cylinder case 51 is not mounted, it is possible to prevent the working fluid within the oil reservoir 62 from leaking out and prevent the dust garbage outside the machine from being mixed, by structuring the concave portion 58 so as to be closed by the cap member 61 such as with a plate body or the like.

It should also be understood that the foregoing relates to only a preferred embodiment of the invention, and that it is intended to cover all changes and modifications of the examples of the invention herein chosen for the purpose of the disclosure, which do not constitute departures from the spirit and scope of the invention.

The invention claimed is:

1. A hydraulic lift structure comprising a hydraulic cylinder case internally provided with a hydraulic cylinder for moving a working machine up and down, wherein said hydraulic cylinder case is arranged in an upper portion of a transmission case of a working vehicle,
    wherein an oil reservoir of a working fluid for said hydraulic cylinder is provided in a boundary portion between said transmission case and said hydraulic cylinder case in such a manner as to be isolated from an inner portion of said transmission case, and
    wherein said oil reservoir is attached in such a manner that a concave portion is formed in an upper portion of said transmission case, and said hydraulic cylinder case covers an upper side of said concave portion.

2. A hydraulic lift structure as claimed in claim 1, wherein said oil reservoir is used as the oil reservoir of the working fluid for said working machine.

3. A hydraulic lift structure as claimed in claim 1, wherein said oil reservoir is used as the oil reservoir of the working fluid for said working machine.

* * * * *